United States Patent [19]

Terao et al.

[11] 3,825,944

[45] July 23, 1974

[54] AUTOMATIC TAPE LOADING DEVICE FOR MAGNETIC TAPE RECORDING AND/OR REPRODUCING APPARATUS

[75] Inventors: Yoshikazu Terao, Tokyo; Junichi Ura, Yokohama, both of Japan

[73] Assignee: Victor Company of Japan, Ltd., Yokohama, Japan

[22] Filed: Oct. 24, 1972

[21] Appl. No.: 299,666

[30] Foreign Application Priority Data

| | | |
|---|---|---|
| Oct. 25, 1971 | Japan | 46-84565 |
| Oct. 25, 1971 | Japan | 46-84566 |
| Oct. 25, 1971 | Japan | 46-98899[U] |
| Oct. 25, 1971 | Japan | 46-98900[U] |
| Oct. 25, 1971 | Japan | 46-98901[U] |
| Oct. 25, 1971 | Japan | 46-98902[U] |
| Oct. 25, 1971 | Japan | 46-98903[U] |
| Mar. 2, 1972 | Japan | 47-25188[U] |

[52] U.S. Cl. .......... 360/85, 360/95

[51] Int. Cl. .......... G11b 15/66

[58] Field of Search .......... 179/100.2 ZA

[56] References Cited

UNITED STATES PATENTS

| | | | |
|---|---|---|---|
| 3,702,383 | 11/1972 | Inaga et al. | 179/100.2 ZA |
| 3,740,492 | 6/1973 | Inaga | 179/100.2 ZA |
| 3,740,495 | 6/1973 | Kihara | 179/100.2 ZA |

*Primary Examiner*—Raymond F. Cardillo, Jr.
*Assistant Examiner*—Robert S. Tupper

[57] ABSTRACT

A tape-autoloading type recording and/or reproducing apparatus comprises a tape out from the interior of a cassette to the outside thereof. The tape thus drawn out is pulled along a predetermined tape path thereby to wrap the same around the circumference of a guide drum. Motive power is transmitted from a single motive power source, first to the tape drawing out means and then to the tape pulling around means. The motive power transmitting means detects the arrival of the drawing out means approximately at a predetermined position and changes over to the pulling around means thereby stopping the motive power transmission to the drawing out means.

5 Claims, 11 Drawing Figures

AUTOMATIC TAPE LOADING DEVICE FOR MAGNETIC TAPE RECORDING AND/OR REPRODUCING APPARATUS

BACKGROUND OF THE INVENTION

This invention relates generally to a recording and/or reproducing apparatus of automatic tape loading type. More particularly, it relates to a recording-reproducing apparatus wherein a tape wound on a spool is drawn out from within a cassette and wrapped helically over a specific angular range around a guide drum.

In general, the invention relates to a magnetic recording-reproducing apparatus of the automatic tape loading type. A magnetic tape is drawn out of a cassette and brought into contact with a guide drum, which has rotating heads. The tape wraps around a specific angular range of the drum, particularly more than 180°, thereby to load automatically the tape in a predetermined tape travel path. A mechanism uses a a plurality of tape guiding means or a mechanism having a single guide means to carry out a plurality of stages of operations in the automatic tape loading operation.

A mechanism for causing a single guide means to carry out a plurality of operational stages has a lever disposed on a ring in a manner which enables free movement of the lever over a specific range. This lever undergoes a selected movement. However, the automatic tape loading operation in this mechanism is unstable and causes errors in loading.

The applicant has previously proposed a recording-reproducing apparatus of autoloading type in U.S. Patent application Ser. No. 246,301, now U.S. Patent No. 3,784,761, Apr. 21, 1972, and entitled TAPE AUTO-LOADING RECORDING AND REPRODUCING APPARATUS. In this previously proposed apparatus, in order to load automatically a tape within a cassette into a predetermined travel path, use is made of two means. First, the tape is drawn out of the cassette interior and pulled around the guide drum. In this proposed apparatus, these two means are provided with respective motive power means which operate separately and successively.

For this reason, while the loading operation in this proposed apparatus is positive and reliable, there is a need for a plurality of motors, complicated mechanism, and high cost.

Therefore, there is an urgent need for a single motive power source capable of positively and reliably drawing out the magnetic tape from the cassette pulling around the thus drawn out tape thereby to wrap the tape around and along a guide drum.

SUMMARY OF THE INVENTION

Accordingly, it is a general object of the present invention to provide an original and effective recording-reproducing apparatus of an automatic tape loading type, which satisfies the above stated need.

More specifically, another object of the invention is to provide an automatic tape loading type recording-reproducing apparatus capable of carrying out successively and continuously, with a single motive power source, the operation of drawing out a magnetic tape from a casette and of pulling the drawn out tape around a guide drum and over a required angular range around its cylindrical surface.

Still another object of the invention is to provide a recording-reproducing apparatus wherein, while a magnetic tape is being drawn out of a cassette by a first tape guide means, a tension lever is held in an inoperative state on the supply side, thereby to cause the drawing out of the tape to be carried out rapidly without undue stress. Still another object is to pull the drawn out tape around the cylindrical surface of the guide drum by a second tape guide means as the tension lever is placed in its operative state, thereby to impart a back tension to the tape thus pulled around, whereby excessive drawing out of the tape is prevented.

A further object of the invention is to provide a recording-reproducing apparatus having a structural organization wherein a tape drawing out means for drawing a magnetic tape out of a cassette is held in an inoperative position, with other components locked in an inoperative position, until the tape drawing out means starts its operation, at which time the annular tape guide structure is unlocked.

A still further object of the invention is to provide a recording-reproducing apparatus of a structural organization wherein when a tape drawing out means, for drawing a magnetic tape out of a cassette has moved to a predetermined position, and is locked in that position by a tape guiding means operating in immediate succession, thereby to prevent fluctuation of the position of the tape drawing out means due to the tape tension.

Additional objects and features of the present invention will be apparent from the following detailed description with reference to preferred embodiments of the invention when read in conjunction with the accompanying drawings.

DETAILED DESCRIPTION

Figure 1:
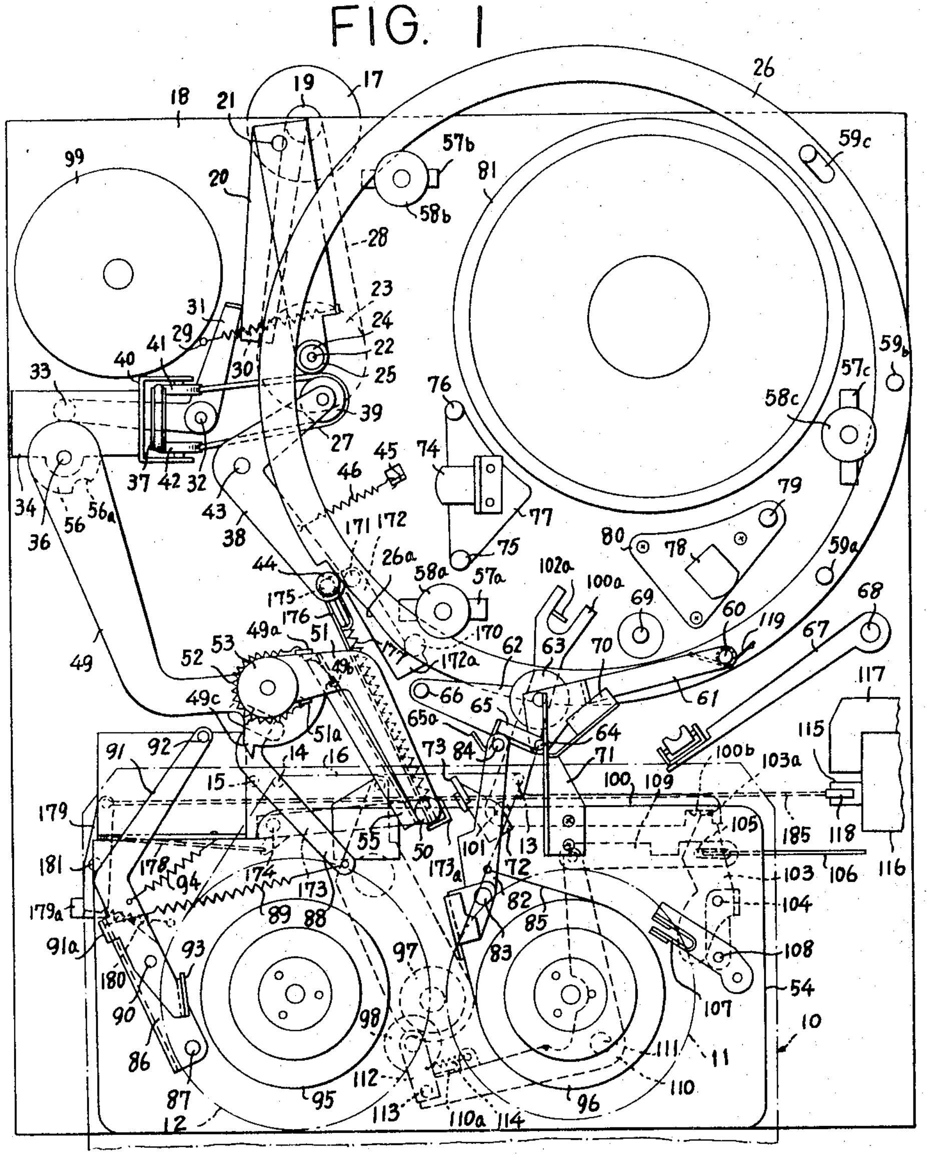
FIG. 1 is a plan view of one embodiment of the automatic tape loading type recording-reproducing apparatus, according to the invention, shown in the state prior to the state of automatic tape loading.
Figure 2:
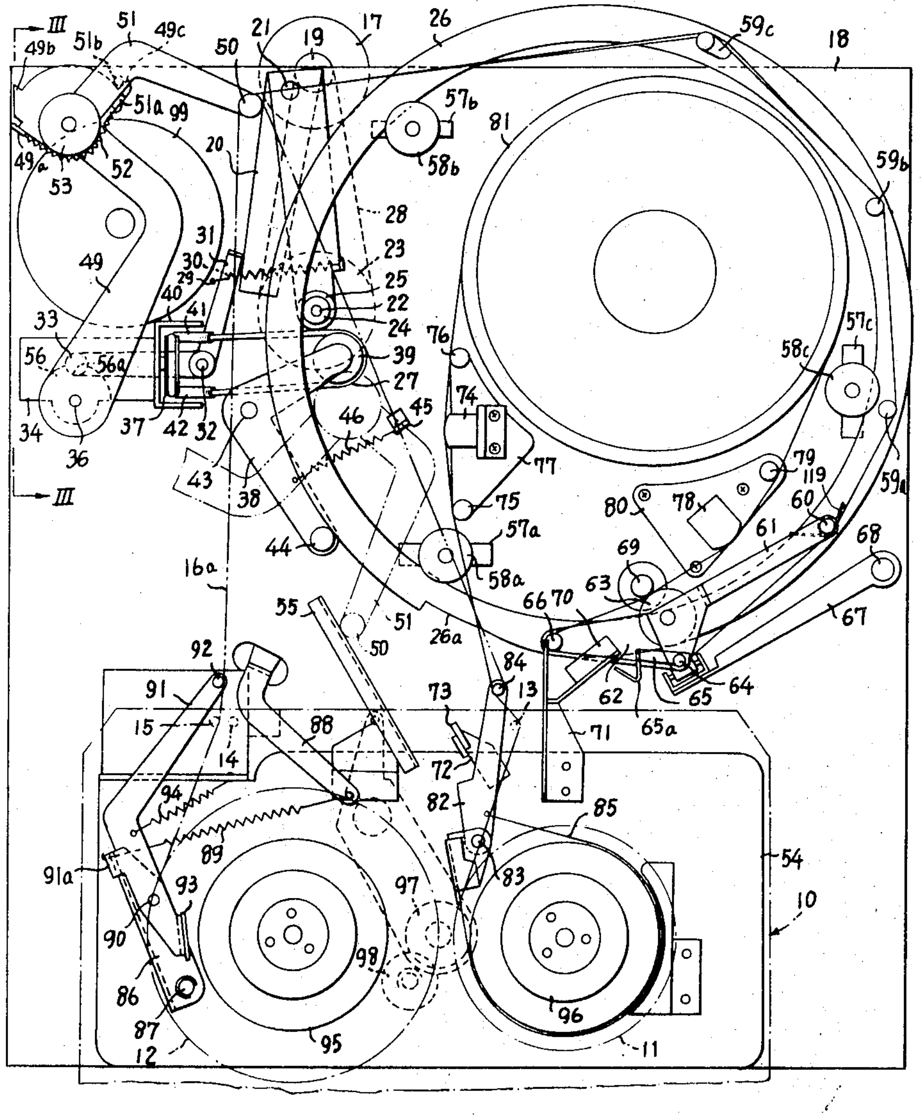
FIG. 2 is a plan view of the apparatus illustrated in FIG. 1, shown in the state after complection of the automatic tape recording.
Figure 3:
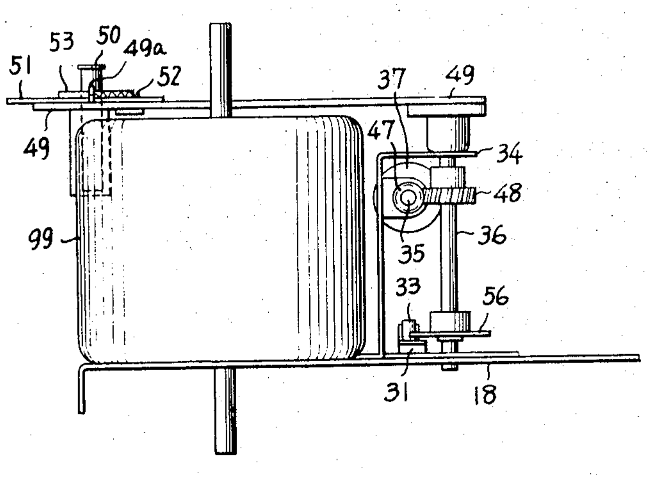
FIG. 3 is a partial side view of the apparatus shown in FIG. 2 taken along the line III — III as viewed in the arrow direction.

In one embodiment of the automatic-type-loading, recording and reproducing apparatus, according to the invention illustrated in FIGS. 1, 2, and 3, a tape cassette 10 contains a built in supply reel 11 and take-up reel 12. Openings (not shown) are formed on the front face and lower cover of the tape cassette 10, within which pins 13, 14, and 15 are provided for guiding the tape. A magnetic tape 16 is drawn from the supply tape reel 11, guided by the pin 13, passed by the above mentioned opening, and between the pins 14 and 15 to the tape take-up reel 12. The tape 16 has its magnetic surface facing the outer side of the casing of the cassette 10.

A loading motor 17 is fixed to the lower side of the chassis 18 of the recording and reproducing apparatus. A U-shaped swingable lever 20 is pivoted on a pivot pin 21, and a shaft 22 is journaled on the distant end of the upper arm. The lower end of this shaft 22 extends through and beyond the chassis 18 and, at its lower extremity, supports a pulley 23 fixed thereto. Driving rollers 24 and 25 are provided on the upper end of this shaft 22. The cylindrical surface of the driving roller 24 confronts the inner surface of a revolving ring 26, while the driving roller 24 confronts a driving belt 27. A pulley 19 fixed to the rotor shaft of the motor 17 is coupled to the pulley 23 by a belt 28 stretched therearound. The U-shaped swingable lever 20 is continually urged to rotate in the clockwise direction, as viewed in FIG. 1, by the tension of a spring 30 stretched between a part of the lever 20 and a pin 29 embeddedly fixed to the chassis 18, but, normally, this rotation of the lever 20 is limited at the position indicated in FIG. 1 by the engagement of the lower arm of this lever with a bent part of the tip of one arm of an L-shaped lever 31. This L-shaped lever 31 is rotatably supported on a shaft 32 and at the end of its other arm supports a pin 33 embeddedly fixed thereto.

A support bracket 34 (FIG. 3), fixed to the chassis 18, rotatably supports a rotating shaft 35 and a rotating shaft 36, which shafts are respectively disposed parallel and perpendicular to the chassis 18. A pulley 37 is fixed to one end of the shaft 35. A belt 27 couples pulley 37 to a pulley 39, rotatably provided on the end of one arm of an L-shaped lever 38, by a belt 27 stretched therearound by way of pulleys 41 and 42 supported rotatably by a bracket 40. The lever 38 is pivoted on a shaft 43 and supports at an end of its other arm a pin 44 embeddly fixed thereto. This lever 38 is continually urged to rotate in the counterclockwise direction by the tension of a spring 46 stretched between a part of this lever and a projection 45 on the chassis.

A worm gear 47 fixed to the above mentioned shaft 35 is meshed with a gear 48 on the shaft 36. A guide lever 49 is fixed at one end to the upper end of the shaft 36 and at its opposite end, it pivotally supports one end of a guide lever 51, which has at its other end a guide pin 50 embeddedly fixed thereto. A tension spring 52 is stretched along the peripheral surface of a pulley 53 between a projection **49*a* on the guide lever 49 and a projection 51*a* on the guide lever 51. The lever 51 is continually urged by the tension of the spring 52 to rotate in the clockwise direction relative to the lever 49. When the apparatus is stopped, the guide pin 50 is engaged with a straight-line guide surface of a guide plate 55 fixed to a sub-chassis 54. Thus the lever 51 is restricted in its rotation and is held in its state shown in FIG. 1. Projections 49*b* and 49*c* on the guide lever 49 cooperate with a projection 51*b* provided on the lower side of the guide lever 51 to limit the rotation of the guide lever 49 within a specific range. A cam 56 is fixed to the lower end of the shaft 36 as shown in FIG. 3. The peripheral cam surface of this cam 56 is contacted and followed by the pin 33 embedded in the L-shaped lever 31. On the peripheral surface of the cam 56, there is formed a cutout part 56*a* for engagement with the pin 33 during the rotation of the shaft 36 up to the position indicated in FIG. 2**.

The above mentioned revolving ring 26 is inclined so that its lower right side as viewed in FIG. 1 is at its lowest part. The ring 26 is revolvably held in this inclined attitude by guide rollers **58*a*, 58*b*, and 58*c* which are rotatably supported, respectively, by three supports 57*a*, 57*b*, and 57*c*. This revolving ring 26 is provided on its outer peripheral surface with a cutout part 26*a* and on its upper surface with guide pins 59*a*, 59*b*, and 59*c* and a pivot pin 60 all embeddedly fixed thereto. The pivot pin 60 pivotally supports one end of a U-shaped lever 61 provided, having at its other end with a support member 62. This lever 61 is continuously urged to rotate in the counterclockwise direction by a torsion spring 119, but its rotation is limited at a specific position. Within the support member 62, a pinch roller 63 is rotatably supported. A support post 64 and an engaging member 65 are fixed to the support member 62, which further supports at its extreme end a guide post 66**.

Figure 10:
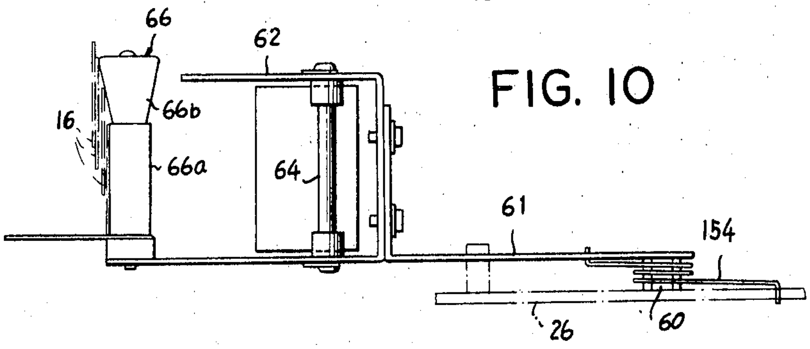
FIG. 10 is a partial elevation of a guide post provided in the tape drawing out means of the apparatus according to the invention.

As shown in FIG. 10, this guide post 66 has a structure made up of a lower cylindrical part **66*a* and an upper part 66*b* having an inverted frustoconical shape, fixed coaxially to the lower part 66*a*. The dimension of these parts are so selected that the diameter of the lower cylindrical part 66*a* is slightly greater than the minimum diameter of the upper inverted frustoconical part 66*b* and is less than the maximum diameter of the upper part. A shoulder or ledge part is thereby formed at and around the upper extremity of the lower cylindrical part 66*a*. During the unloading operation of the apparatus, as described hereinafter, the entire width of a magnetic tape 16 initially engages the lower cylindrical part 66*a* and shifts its engagement position upwardly relative to the guide post 66. Since there is no projecting stepped part constituting an obstacle on the guide post 66, relative to the direction the shifting of this tape engagement position, the magnetic tape 16 is shifted smoothly along the guide post 66**.

An operation lever 67 is rotatably supported at its proximal end by a shaft 68 and is in the position indicated in FIG. 1 when recording or reproducing is not being carried out. At the time of recording or reproducing, this lever 67 is rotated to its position shown in FIG. 2. It presses the support post 64 toward a capstan 69, thereby rotating the lever 61 and causing the pinch roller 63 to press against the capstan 69. A luminous device 70 is mounted on a support member 71 fixed to the sub-chassis 54. Similarly, a light-receiving device 73, such as a photocell, is mounted on a support member 72 fixed to the sub-chassis 54. These two devices 70 and 73 cooperate to detect a leader part bonded to each terminal end of the magnetic tape 16 and thereby to detect the terminal of the tape.

A full-width erasing head 74 and guide posts 75 and 76 are mounted on a support base 77, which is separated by a specific distance from the cahssis 18 and is positionally adjustable. A head blodk 78 for control signals and audio signals and a guide post 79 are mounted on a support base 80 disposed with an inclination relative to the chassis 18 so that the head block 78 and the guide post 79 is perpendicular to the plane of the revolving ring 26. Similarly, the capstan 69 is also inclined relative to the chassis 18. A guide drum 81 is disposed within the revolving ring 26. The lower part of the guide drum is fixed to the chassis 18, while the upper part of the guide drum has therein rotary video heads. The two guide drum parts are separated by a slight gap in which the video heads are adapted to rotate. This guide drum 81 is also inclined relative to the chassis 18.

Next, the organization of the reel disk section will be described. At one end thereof, a tension lever 82 is pivoted on a shaft 83. On its other end, it supports a tension post 84 embeddedly fixed thereto. A brake band 85, whose two ends are fixed to a tension lever 82, is disposed about the periphery of a supply reel disk 96. When the tension lever 82 is turned in the counterclockwise direction, the brake band 85 is tightened to apply a braking force to the reel disk 96. A lever 86 is pivoted at its proximal end on a shaft 87 and is urged to turn in the clockwise direction by a spring 89 stretched between it and an operating lever 88. When recording or reproducing is not being carried out, this lever 86 is rotated in the counterclockwise direction against the spring force of the spring 89 by another spring (not shown). Its rotation is limited at a specific position as shown in FIG. 1. At a point remote from the shaft 87, the lever 86 supports a pivot pin 90 embeddedly fixed thereto and pivotally supporting a tape take-up side tension lever 91.

The tension lever 91 at its one end supports a tension pole 92 embeddedly fixed thereto. At its other end, there is provided a brake shoe 93. This tension lever 91 is urged to turn in the clockwise direction by a spring 94 stretched between it and the sub-chassies 54. When the lever 86 is in its position indicated in FIG. 1, the rotation of the tension lever 91 is restricted at the position where a bent flange part 91*a* thereof has come into contact with the lever 86. The brake shoe 93 is separated from a take-up reel disk 95. At the time of recording or reproducing, the operating lever moves to the position indicated in FIG. 2. Since the tension of the spring 89 increases, the lever 86 reaches a position where it has rotated in the clockwise direction, and the tension pole 92 and the brake shoe 93 are placed in their operational states.

A reel disk driving wheel 97 is adapted to operate in accordance with mode changeover operations such as record-reproduce, stop, and rewind to move, respectively, into a position for pressing against the take-up reel disk 95, acting, a neutral position, and a position for pressing against the supply reel disk 96. A wheel 98 is provided to apply a torque to the take-up reel disk 95 in the direction for unwinding the magnetic tape during the rewinding operation of the magnetic tape, which has been drawn out of the cassette and is wrapped around the guide durm 81.

The apparatus of the above described organization, according to the invention, operates as follows. In the state prior to the start of the automatic tape loading operation as indicated in FIG. 1, the L-shaped lever 38 is in its position to which it has been rotated in the counterclockwise direction by the spring 46, the pin 44 fixed to one end of this lever 38 being fitted in the cutout part 26*a* of the revolving ring 26. The belt 27 around the pulley 39, at the other end of the lever 38, is pressed against the driving wheel 25. Furthermore, the L-shaped lever 31 is in a position where the pin 33 fixed to one end thereof is pressed into contact with the outer peripheral surface of the cam 56. Lever 31 has rotated in the clockwise direction. The U-shaped lever 20 is engaged with the other end of the lever 31 and is in a position to which it has rotated in the counterclockwise direction. Consequently, the driving wheel 24 is in a position where it is separated from the internal surface of the revolving ring 26. The guide post 50 is in the position indicated in FIG. 1, in contact with the guide plate 55. The guide lever 51 is in a position to which it has rotated in the counterclockwise direction against the tension force of the spring 52.

With the apparatus in the above described state, the cassette 10 is inserted from above into position in the recording-reproducing apparatus as indicated in FIG. 1. The guide post 50 is fitted into the cassette 10 through an opening (not shown) and is thus disposed on the inner side of the tape 16. Furthermore, the spools holding the tape supply reel 11 and the tape take-up reel 12 engage with respective reel tables on the apparatus side. When the PLAY button (not shown) of the apparatus is depressed with the apparatus in this state, the loading motor 17 starts, and the pulley 19 is rotated in the clockwise direction. The rotation of the pulley 19 is transmitted through the belt 28 and the pulley 23 to the shaft 22, whereby the driving wheels 24 and 25 are rotated in the clockwise direction. At this time, the driving wheel 24 is separated from the revolving ring 26, whereby the rotation of the wheel 24 is not transmitted to the ring 26. On the other hand, the driving wheel 25 and the belt 27 are in close contact, whereby the rotation of the wheel 25 is transmitted to the belt 27 and thus to the pulley 37 thereby to rotate the shaft 35. The rotation of the shaft 35 is transmitted by way of the worm 47 and worm gear 48 to the shaft 36, which is thereby rotated in the counterclockwise direction. Consequently, the guide lever 49 and the cam 56 rotate integrally with the shaft 36 in the counterclockwise direction.

As a result of the rotation of the guide lever 49, the guide lever 51 is rotated about the pulley 53 by the tension force of the spring 52, with rotation in the clockwise direction relative to the guide lever 49. During this operation, the guide post 50, guided by the guide plate 55, moves while drawing the magnetic tape 16 out from the interior of the cassette 10 to a position indicated by the two-dot chain line in FIG. 2. When the guide lever rotates further in the counterclockwise direction, the projection 51*b* of the guide lever 51 and the projection 49*c* of the guide lever 49 engage, whereby the clockwise rotation of the lever 51 is restricted. Thereafter the lever 51 rotates integrally with the lever 49 about the shaft 36, in the counterclockwise direction, until it reaches the position indicated by full line in FIG. 2. At this time, the magnetic tape which has been drawn out of the cassette 10 by the guide post 50 forms a tape loop 16*a* of substantially triangular shape as indicated by single-dot chain line in FIG. 2.

At the time when the guide lever 49 reaches the position indicated by full line in FIG. 2 as described above, and the formation of the magnetic tape loop 16*a* is completed, the cam 56 has also been rotated integrally to a position where its cutout part 56*a* confronts the pin 33. Consequently, the pin 33 fits into the cutout part 56*a* of the cam 56. The L-shaped lever 31 rotates counterclockwise under the tension force of the spring 30. As a result of the rotation of the lever 31, the U-shaped lever 20 is released from its engagement by the lever 31 and is rotated clockwise by the spring 30, whereby the driving wheel 24 presses against the internal surface of the revolving ring 26. Accordingly, the rotational power of the motor 17 is transmitted by way of the driving wheel 24 to the ring 26, which thereupon is driven in the clockwise direction. In this connection, even when the U-shaped lever 20 is in a state where it has been rotated only slightly in the clockwise direction as mentioned above, the rotation of the driving wheel 25 is being transmitted to the belt 27.

As the revolving ring 26 revolves clockwise from its position indicated in FIG. 1 the pin 44 which has been engaged with the cutout part 26a moves relative to the ring 26 and is guided onto an inclined part. The L-shaped lever 38 is rotated in the clockwise direction against the tension force of the spring 46. Consequently, the belt 27 separated away from the driving wheel 25, and the transmission of motive power to the shaft 36 is cut off. As a result, the rotation of the guide lever 49 is stopped at the position indicated by full line in FIG. 2. The revolving ring 26 thereafter revolves independently.

Since the revolving ring 26 is inclined, as described hereinbefore, its rotation first causes the guide post 66, the pinch roller 63, the shaft 60, and the guide pins 59*a*, 59*b*, and 59*c* to pass by in succession and below the point where the magnetic tape 16 is first transversed and, as viewed in plan view, to enter the above mentioned tape loop 16*a*. As the revolving ring 26 revolves further, the guide post 66 and the succeeding parts named above progressively rise in height in accordance with the inclination of the ring 26. Together with this revolution of the ring 26, the guide post 66 and the succeeding parts, as viewed in plan view, travel from within the tape loop 16a toward the outside. During this movement, the guide post 66 in the lead engages the magnetic tape 16 and, drawing the tape around together with the revolution of the ring 26, wraps the tape around the peripheral surface of the guide drum 81.

When the revolving ring 26 thus revolves and reaches a predetermined position, a main motor 99 is started. The rotary video heads, the capstan 69, and other parts begin to rotate. When the revolving ring 26 has revolved substantially one revolution from the position indicated in FIG. 1 and reaches the position indicated in FIG. 2, the tape 16, which is being engaged and drawn around by the guide post 66, is held against the cylindrical surface of the guide drum 81 by the guide posts 76 and 79. The tape is thus caused to make contact with this surface over a specific angular region, which in the instant embodiment is somewhat greater than 180°. At this time, the fact that the required length of the tape 16 has been paid out is detected by the detection means comprising the luminous device 70 and the light receiving device 73. From this, the completion of loading of the tape 16 is detected. Accordingly, the recording-reproducing apparatus is changed over from the loading mode to the recording or reproducing mode of operation. Consequently, the operating lever 67 shifts to the operation position. The pinch roller 63 presses the magnetic tape 16 against the capstan 69. Furthermore, the take-up reel disk 95 is actively rotated in the tape take-up direction by the roller 97.

When the revolving ring 26 has revolved to and stopped at the position indicated in FIG. 2, the loading of the magnetic tape 16 is completed into the required tape travel path. The state of this required tape travel path formed at this time is as follows. The tape 16 unwound from the tape supply reel 11 is led out of the cassette 10, being guided by the pin 13. Under the guidance of the tension pole 84 and the guide post 75, the tape comes into contact with the full-width erasing head 74, where the tape is erased over its full width during recording (no erasing being carried out for reproducing operation). The tape 16 is next brought diagonally across the cylindrical surface of the guide drum 81 over a certain angular region determined by the guide posts 76 and 79, within which video signals are recorded or reproduced. Further on, the tape 16 contacts the head block 78, where audio signals and control signals are recorded or reproduced. The tape then reaches the piont between the capstan 69 and the pinch roller 63. The tape 16, which is thereby squeezed and driven, is guided by the guide post 66 and caused to undergo an inversion of its travel direction by approximately 180°. The tape 16 then passes by the support post 64 and, guided by the shaft 60 and guide pins 59*a*, 59*b* and 59*c*, is further guided by the guide post 50 and the tension pole 92. Thereafter, the tape reenters the cassette 10 at a height which is substantially the same as the height of the tape being paid out from the cassette and, guided by the guide pin 15, is wound on the tape take-up reel 12.

At the time of unloading, the motor 17 rotates in the counterclockwise direction, which is opposite to that described above. All of the members described above operate in sequence and directions opposite to those occurring during the autoloading mode of operation. Accordingly, the recording-reproducing apparatus changes in state from that shown in FIG. 2 to that shown in FIG. 1. The magnetic tape 16 drawn out of the cassette 10 is completely returned again within the cassette 10.

In the loading operation: a first guide means comprising the guide post 50 and related parts operates to move to a specific position as it draws the magnetic tape 16 out of the cassette 10; a detecting means detects this movement of the first guide means to the specific position; and a second guide means comprising the revolving ring 26 and related parts operates in response to this detection result, to thereby cause the first guide means to stop at the above mentioned specific position. At the same time, the tape is pulled around the guide drum 81, over a specific angular region thereof. Accordingly, it is possible with a single driving power source to drive in succession the first guide means and then the second guide means.

Next, a stopping mechanism incorporated within the above described recording-reproducing apparatus will be described with reference to FIGS. 1, 2, 4, and 5. As shown in FIGS. 1 and 2, an L-shaped lock lever 100 is rotatably supported on a shaft 101 and is provided with a forked part 100*a* at the end of one arm thereof and with a cutout part 100*b* on the other arm thereof. The forked part 100*a* is engaged by a bent part 102*a* of an arresting lever 102 shown in FIGS. 4 and 5. The cutout part 100*b* is engaged by a projection 103*a* of a rotatable lever 103. An instant stop lever (not shown) is then locked. The lever 103 is pivoted on a pivot pin 104. Lever 103 supports at one end thereof a pin 105 embeddedly fixed thereto and connected to a connector 106 operating at the time of instant stopping action. The other end of the lever 103 is provided with a pin 108 embeddedly fixed thereto and operating to apply and retract a brake 107 to and from the tape supply reel disk 96.

One end of a lever 109 is pivoted on the end of one arm of an L-shaped lever 110, while the other free end of the lever 109 is provided with a longitudinal slot engaged by the above mentioned pin 105. The lever 110 is pivoted on a pivot pin 111. On the end of its other arm, a support member 112 is pivoted by a pivot pin 113, the support member 112 rotatably supporting the roller 98. The support member 112 is urged to rotate in the clockwise direction by a spring 114 stretched between it and the lever 110 but is restricted from rotating past a position where it is arrested by bent part 110a provided on the lever 110.

For playing a plunger 116 is placed in operative state by the depression of the aforementioned PLAY button (not shown). The plunger 116 is fixed to a suppot member 117 and has an operating bar 115 provided with a lever 118, which free to rotate in the axial direction.

Figure 4:
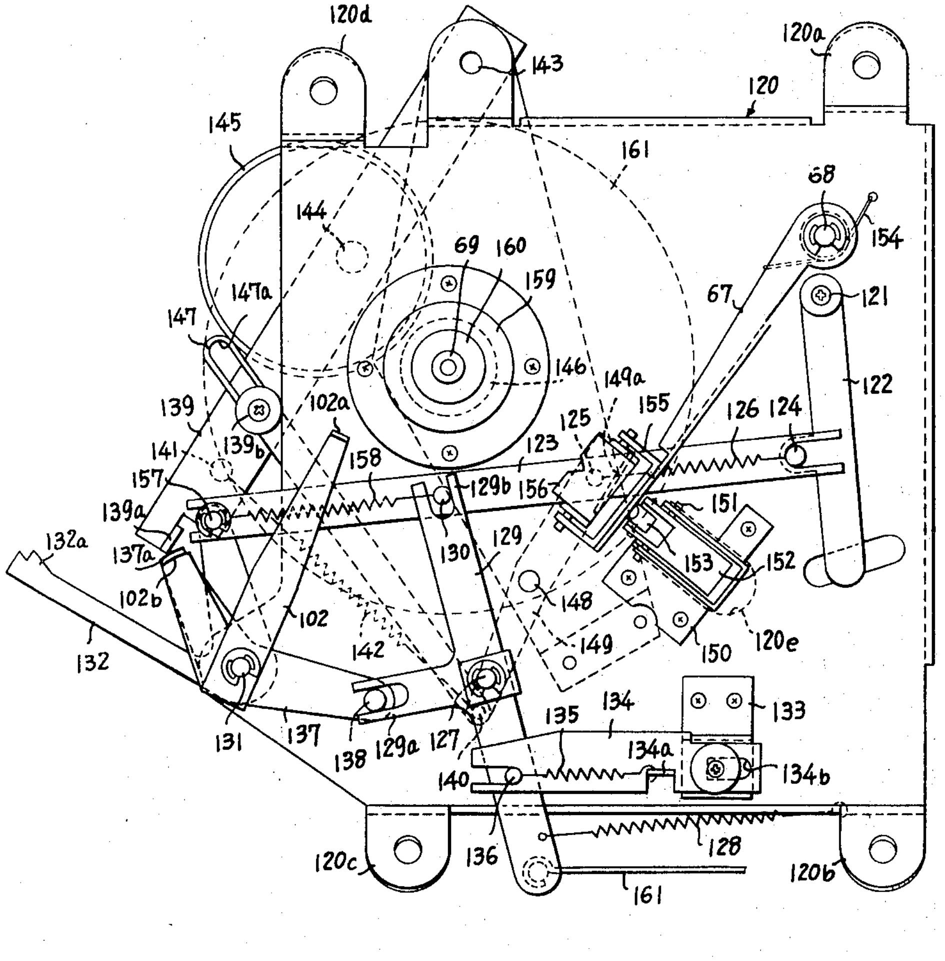
FIGS. 4 and 5 are plan views showing an instant stopping mechanism of the apparatus of the invention and respectively indicating different operational states.

The operation of a pinch roller pressing mechanism provided with the instant stopping mechanism will now be described with reference to FIGS. 4 and 5. FIG. 4 shows the state where the pinch roller pressing mechanism is in a non-operating state. When the above mentioned PLAY button (not shown) is depressed, the plunger 116 is operated. The braking force is removed from the two reel disks 95 and 96. At the same time, the operating bar 115 acts to rotate a lever 112 in the counterclockwise direction up to the position shown in FIG. 5.

Lever 122 is pivoted at one end thereof on a pivot pin 121 embeddedly fixed to a sub-chassis 120. This sub-chassis is mounted on the chassis 18 by means of projecting flanges 120*a* through 120*d*. The counterclockwise rotation of the lever 122 is followed by a sliding bar 123 having a forked part formed by a U-shape slot at one end thereof engaged by a pin 124 embeddedly fixed to the lever 122. This sliding bar is urged toward the right, as viewed in FIGS. 4 and 5, by a tension spring 126 stretched between the pin 124 and a pin 125 embeddedly fixed to the sliding bar 123.

The sliding movement of the sliding bar 123 follows the counterclockwise rotation of the lever 122. Responsive thereto a clockwise rotation of a T-shaped lever 129 occurs about its pivoted its middle part on a pivot pin 127. Arm 129 has a forked end 129*b* on one of its arms with a U-shaped slot engaged by a pin 130 embeddedly fixed to an intermediate part of the sliding bar 123. This lever 129 is continually urged to rotate in the counterclockwise direction by a tension spring 128 stretched between it and a part of the sub-chasis 120. The above mentioned sliding movement of the sliding bar 123 is also followed by a hook lever 132 pivoted on a pivot pin 131 embeddedly fixed to a projection of the sub-chassis 120. A pin 157 is embeddedly fixed to the outer end of lever 132 and engaged with a U-shaped slot in the other end of the sliding bar 123. This hook lever 132 is urged to turn in the clockwise direction by the tension force of a spring 158 stretched between the pin 157 and the pin 130 of the bar 123. A hook 132*a* formed at the extremity of the other arm of the hook lever 132 reaches the operational position indicated by full line in FIG. 5.

An arresting lever 134 has at one end thereof a longitudinal slot 134*b* engaged by a member such as a screw fastened into a support member 133 mounted on the sub-chassis 120. Lever 134 is thus held in a manner whereby it if free to slide within a specific stroke range. At its other end, this lever 134 has a U-shaped slot engaged by a pin 136 embeddedly fixed to the above mentioned T-shaped lever 129. A spring 135 is stretched between this pin 136 and a bent flange 134*a* of the lever 134, which s caused by the clockwise rotation of the lever 129. The tension of the spring causes lever 134 to move toward the left as viewed in FIG. 5, within the limit imposed by the slot 134*b*.

For this reason, the attractive force of the aforedescribed plunger 116 is satisfactory in the beginning, provided that it exceeds the tension force of the relatively weak spring 128 and in the final stage, provided that it can overcome the sum of the tension forces of the relatively strong spring 135 and the spring 128 in case the pin 136 moves beyond the limit imposed by the slot 134*b* of the arresting lever 134. Therefore, a relatively miniature plunger can be used as the plunger 116 for playing.

Figure 5:
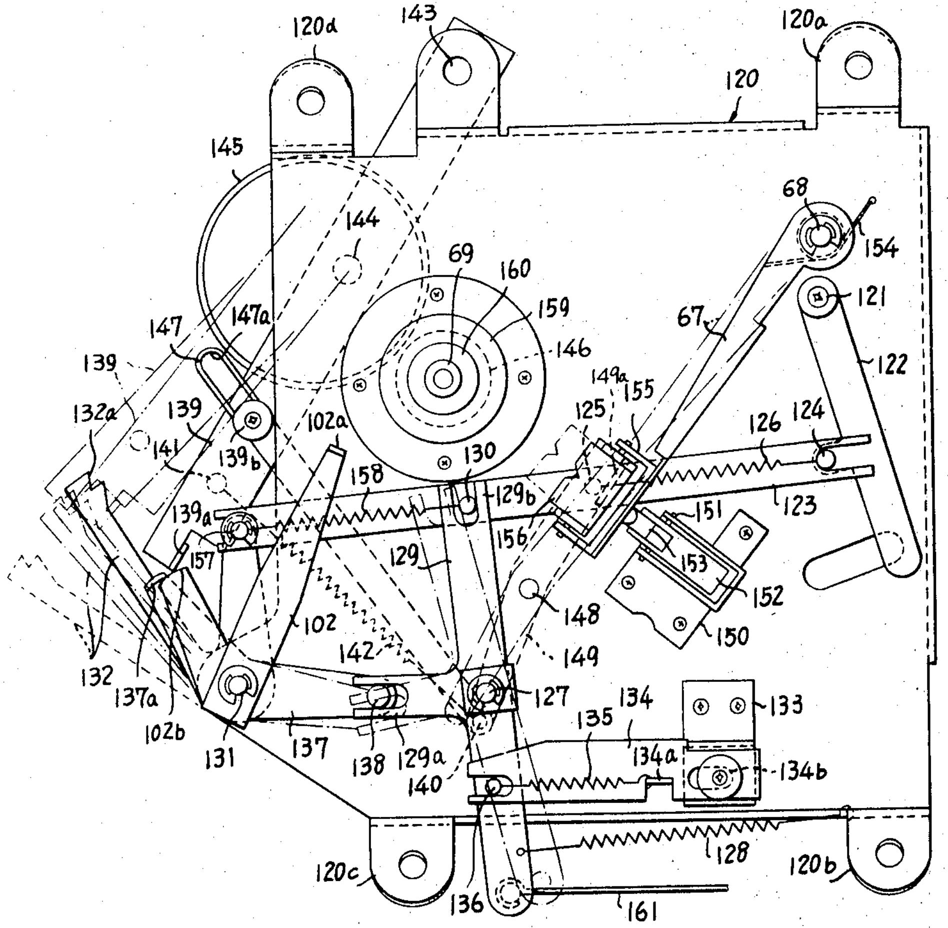

Furthermore, as a result of the clockwise rotation of the T-shaped lever 129, an arresting lever 137 pivoted on the pivot pin 131 and having at the end of one of its arms an embeddedly fixed pin 138 engaged with a U-shaped slot formed at the end of the central arm of the T-shaped lever 129 is rotated clockwisely to the position indicated by full line in FIG. 5. Consequently, an arresting part 137*a*, provided on the other end of the arresting lever 137, moves to its inoperative position, and is thus disengaged from a projection 139*a* of a lever 139. The lever 139 is pivoted at one end thereof on a pivot pin 143 and is urged to rotate in the counterclockwise direction by the tension force of a spring 142 stretched between a pin 141 embeddedly fixed thereto at a point near its other end and a pin 140. However, lever 139 is restricted from rotating beyond the position indicated in FIG. 5 by the engagement of the projection 139*a* by an arresting part 102*b* of the lever 102. An eccentric cam 145 is rotatably and eccentrically supported on a pivot pin 144 embeddedly fixed to the lever 139. The cam is separated by a very small distance from a pulley 146 fixed to the same shaft as the capstan 69, whereby the rotation of the capstan is transmitted to the eccentric cam 145.

When the revolving ring 26 rotates from the state shown in FIG. 1 to the final position indicated in FIG. 2, the lock lever 100 is contacted by a pin (not shown) embeddedly fixed to the lower side of the ring 26 and is thereby rotated in the counterclockwise direction. Consequently, the arresting lever 102 causes its projection 102*a* to engage the forked part 100*a* of the lock lever 100 and is thereby rotated in the counterclockwise direction. The arresting part 102*b* of the lever 102 disengages from the projection 139*a* of the lever 139. The lever 139 thus released is rotated again in the counterclockwise direction by the tension force of the spring 142, whereby the eccentric cam 145 is pressed against the pulley 146. The rotation of the pulley 146 is transmitted to the eccentric cam 145. The capstan 69 is rotatably supported by a bearing 160 provided on a support member 159 fixedly mounted on the sub-chassis 120 and is provided with a flywheel 161 fixed to its lower end.

As a result of the counterclockwise rotation of the eccentric cam 145 relative to the pivot pin 144, the lever 139 is rotated in the clockwise direction about the pivot pin 143 as a screw 139*b* provided on the upper surface of the lever 139 is engaged and guided by a slot 147*a* formed on one end of a guide lever 147 pivoted on the other end on the pin 140. Consequently, a lever 149 which is pivoted at approximately its middle part on a pivot pin 148 is rotated in the clockwise direction by the spring 142 stretched between the pin 140 embeddedly fixed to one end of the lever 149 and the pin 141 of the lever 139.

As a result, a pressing member 152 having an approximately L-shaped side surface and rotatably supported by a pivot pin 151 provided on a support member 150, which is fixed to the sub-chassis 120, passes through an opening 120e formed in the sub-chassis 120. Member 152 is arrested by an engagement pin (not shown) as it rotates in the counterclockwise direction.

Furthermore, the bent part **102*a* of the lever 102 engages the forked part of the lock lever 100, whereby the lever 102 is rotated in the counterclockwise direction. Consequently, the engaging part 102*b* and the projection 139*a* of the lever 130 become disengaged. The tension of the spring 143 causes the lever 102 to rotate further in the counterclockwise direction, and the eccentric cam 145 is pressed against the pulley 146. Furthermore, the rotation of the lever 139 is transmitted by way of the guide lever 147 to rotate the lever 149. The operating lever 67 is rotated, its projecting part on its lower side being engaged by a bent end part 149*a* of the lever 149. Lever 67 is further rotated in the clockwise direction against the torque of a torsion spring 154, being engaged by a roller 153 provided on the end of the pressing member 152. This clockwise rotation of the operating lever 67 is transmitted by way of a pinch roller pressing member 156 having an approximately U-shaped side profile and held by a holder 155 mounted on the free end of the lever 67 to cause the pinch roller 63 to press the magnetic tape 16 against the capstan 69**.

During the clockwise rotation of the lever 139, its projection **139*a* intercepts the arm provided with the hook 132*a* of the hook lever 132, which has been rotated to the position indicated by full line in FIG. 5. This arm undergoes a clockwise rotation to the position indicated by a single-dot chain line in FIG. 5 against the force of the spring 158. As still another result of the rotation of the lever 139, the projection 139*a* engages the hook 132*a* and assumes a state of arrest thereby an indicated by two-dot chain line in FIG. 5. At this time, the eccentric cam 145 is separated from the pulley 146. Then, the various component parts of the pinch roller pressing mechanism assume their respective states, as indicated by the single-dot chain line in FIG. 5. The pinch roller 63 is pressed against the capstan 69 with the magnetic tape 16** interposed therebetween, whereby the tape is driven and caused to travel.

With the parts in their respective states as described above, the lock lever 100 is in a position to which it has been rotated in the counterclockwise direction, being intercepted by a pin (not shown) embeddedly fixed to the lower surface of the revolving ring 26. For this reason, the projection **103*a* of the lever 103 is separated from the cutout part 100*a* of the lock lever 100**. The recording-reproducing apparatus assumes a state wherein instant-stopping operation is possible.

The instant-stopping operation wherein, in the recording-reproducing mode of operation, the magnetic tape is temporarily stopped is accomplished as follows. An instant-stopping ever or button (not shown) of the recording-reproducing apparatus is manipulated and placed in its instant-stopping position, whereupon the connector 161 coupled to one end of the T-shaped lever 129 is shifted to the right as viewed in FIG. 5. Consequently, the T-shaped lever 129 is rotated in the counterclockwise direction counter to the force of the spring 126, and the sliding bar 123 is caused to slide leftward as viewed in FIG. 5 by the engagement of the pin 130 by the U-shaped cutout part of the end **129*b* of the lever 129. As a result, the hook lever 132 is rotated in the counterclockwise direction. The pin 157 fixed to the end of its arm is thereby engaged. The hook 132*a* and the projection 139*a* of the lever 139 become disengaged. The lever 139 thus released is rotated slightly in the counterclockwise direction by the tension of the spring 142. The eccentric cam 145 is pressed against the pulley 146. Furthermore the lever 139 is rotated in the counterclockwise direction by the rotation of the eccentric cam 145 transmitted by the pulley 146. As another result of the counterclockwise rotation of the T-shaped lever 129, the lever 137 is rotated in the clockwise direction by the engagement of the pin 138 in the U-shaped cutout part 129*a* of the lever 129. The engagement part 137*a* of this lever 137 reaches an operational position where it confronts the projection 139*a* of the lever 139**.

Consequently, the lever 139 is rotated in the counterclockwise direction up to the position where its projection **139*a* contacts and is stopped by the arresting part 137*a*, at which time the eccentric cam 145 is separated from the pulley 121. The rotation of the lever 139 is transmitted by way of the guide lever 147 to cause the lever 149 to rotate in the counterclockwise direction. The lower end of the pressing member 152 is released from its engagement with the bent part 149*a*. As a consequence, the operating lever 67 is rotated, together with the pinch roller pressing member 156, in the counterclockwise direction by the torsion spring 154. The pinch roller 63 is separated from the capstan 69, whereby the travel of the tape 16** is instantaneously stopped.

The above described control operation for instant stopping causes the connector 106 (FIGS. 1 and 2) to move toward the right. The lever 103, having projection **103*a* in a disengaged state, is rotated in the clockwise direction. Consequently, the brake 107 is placed in its operative state by the pin 108 fixed to this lever 103, and a braking torque is applied to the supply reel disk 96**.

At the time of the above described instant stopping, the tape 16 is stopped in a state wherein it is drawn out of the cassette 10 and is forming a predetermined tape path. Moreover, that is no possibility of an unloading being carried out. Accordingly, the above described mechanism can be used also for reproduction of still motion pictures in addition to its use for instant stopping. It can also be used in the case where, at any instant, the recording-reproducing mode of operation of the recording-reproducing apparatus is stopped in the previous state. Furthermore, after completion of the instant stopping, the recording-reproducing apparatus continues its previous recording and reproducing mode of operation.

When the above mentioned instant-stopping lever (not shown) is further operated and shifted to its instant rewinding position, the connector 161 coupled to the T-shaped lever 129 does not operate. However, the connector 106, coupled to the lever 103, moves further toward the right. The lever 103 is rotated further in the clockwise direction. Hence, the lever 109 is moved toward the right as viewed in FIG. 2 by the engagement of the pin 105 with the right end of the slot in the lever 109. The L-shaped lever 110 is rotated in the clockwise direction. Consequently, the roller 98 supported on the member 112 is pressed both the reel disk driving wheel 97 and the supply reel disk 96. The reel disk 96 rotates in the tape take-up direction. Thus, the instant rewinding operation is carried out. In this connection, the plunger 116 for playing is maintained in its operative state at the time of the above described instant stopping and at the time of the instant rewinding, and after completion of each of the control operations. The recording-reproducing apparatus continues its previous recording or reproducing mode of operation.

The operation for applying a back tension to the tape 16 drawn out of the cassette 10, at the time of unloading of the recording-reproducing apparatus, will now be described with reference to FIGS. 1 and 2. When the recording-reproducing apparatus is in the non-operating state indicated in FIG. 1, braking forces are applied to both the take-up reel disk 95 and the supply reel disk 96. When the PLAY button is depressed, the apparatus is switched from the stopped condition to the loading condition, whereupon the supply reel disk 96 is released from the braking force of the braking means (not shown). At this time, the take-up reel disk 95 remains in its braked state. Furthermore, the tension lever 82 on the supply side is being subjected to a counterclockwise torque due to a spring (not shown). The tension pole 84 is restricted in rotation at an inoperative position, being arrested by an engagement part 65*a* of the arresting member 65 fixed to the support member 62 by the support post 64. The brake band 85 fixed at its two ends to the tension lever 82, and disposed around the supply reel disk 96, is in its slack or release state.

The operational step of drawing out the tape is the first stage of the loading operation. The shaft 36 rotate in the counterclockwise direction to the position indicated in FIG. 2, together with the guide levers 49 and 51 and the guide post 50. The magnetic tape 16 drawn from the tape supply reel 11 is engaged by the guide post 50 and drawn out of the cassette 10. At this time, the tape is not subjected to a back tension. The tape drawing out operation is carried out smoothly and rapidly without abnormal stress and with only a small amount of mechanical power.

After completion of this step of drawing out the tape, and after the tape 16 thus drawn out has formed a tape loop of approximately triangular shape with the guide post 50 as the vertex as indicated by two-dot chain line in FIG. 2, the revolving ring 26 begins rotating in a clockwise direction, as described hereinbefore. Then the engagement member 65 also rotates, and the tension pole 84 is released from its engagement with the engaging part 65*a* of the member 65. The tension lever 82 thus released is rotated in the counterclockwise direction by the tension force of a spring (not shown). The tension pole 84 is placed in an operational state of contact with the tape 16 which has been paid out from the tape supply reel 11 and drawn out of the cassette 10. As a consequence, the revolving ring 26 is rotated to its final position indiciated in FIG. 2. The drawn out tape 16, intercepted by the guide post 66, is further pulled around and wrapped diagonally over a specific angular range around the cylindrical periphery of the guide drum 81. During this operation, the supply reel disk 96 is being braked by the brake band 85. A back tension is applied to the tape 16 paid out from the tape supply reel 11. Furthermore, the magnitude of the back tension on the tape 16 is detected by the tension lever 82, whereby the braking force of the brake band 85 on the reel disk 96 is controlled. The quantity of the tape paid out of the cassette 10 is controlled. Therefore, drawing out of an excessive amount of tape from the cassette, at the instant of completion of the loading operation, is prevented. The automatic tape loading operation is accomplished in a positive and reliable manner.

Figures 6, 7:
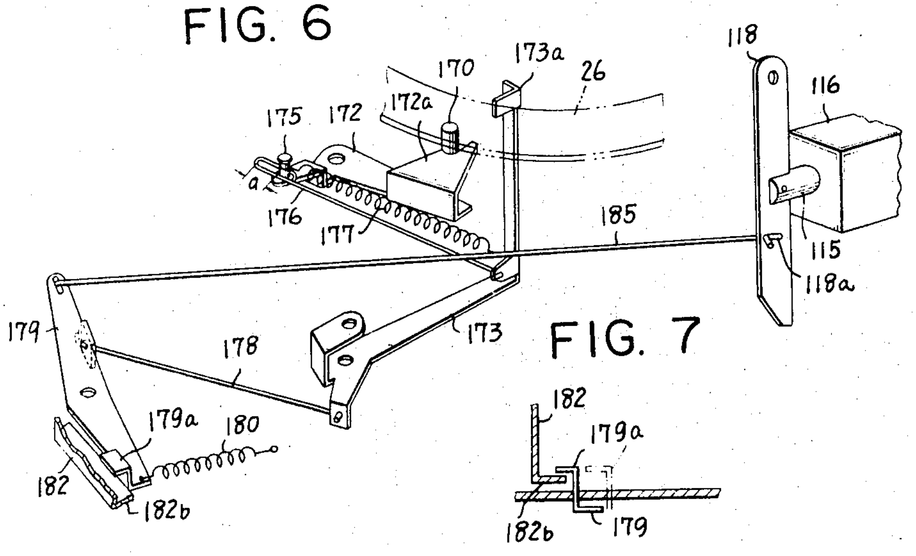
FIG. 6 is a partial perspective view of an ejecting lock mechanism of the apparatus of the invention.
FIG. 7 is an enlarged, fragmentary elevation, in vertical section, indicating the locked state of a cassette housing.

Next, the organization and operation of an eject-lock mechanism and a mechanism for locking the revolving ring in the above described magnetic recording-reproducing apparatus of autoloading type will be described in conjunction with FIGS. 1, 2, 6, 7, and 8. When the revolving ring 26 is in the inoperative position shown in FIGS. 2 and 6, its rotation is being restrictively stopped since a pin 170 embedded at a specific position on the lower surface of the ring 26 is being engaged by a bent engagement part 172*a* formed on one end of an L-shaped ring-locking lever 172 pivoted on a pivot pin 172 embedded in to chassis 18. A lever 173, pivoted on a pivot pin 174, has at one end a vertically rising part whose upper end extends upward and above the sub-chassis 54 and supports a detecting part 173*a* for contacting the base part of the guide post 50. The base of the rising part of the lever 173 and a pin 175 embedded in to the other end of the locking lever 172 are linked by a bar 176 and, moreover, are joined by a tension spring 177 stretched therebetween. Consequently, the lever 173 and the locking lever 172 are each subjected to a counterclockwise torque. The coupling between the pin 175 of the locking lever 172 and the bar 176 is constructed as shown in FIG. 6, whereby the pin 175 is actuated through a distance *a* independently of the bar 176 and the lever 173.

When the recording-reproducing apparatus is in the non-operating state indicated in FIG. 1, the revolving ring 26 is restricted and locked as described above. The lever 173 is in a position to which it has been rotated in the counterclockwise direction against the force of the spring 177 by the engagement of the detecting part 173*a* by the base part of the guide post 50. Consequently, an ejecting lever 179 linked by a rod 178 to the lever 173 is released from its engagement by the bent end part of the rod 178. Lever 179 has been rotated in the counterclockwise direction about a pivot pin 181 responsive to the tension of a spring 180 stretched between the lever 179 and the sub-chassis 54. For this reason, an engagement part 179*a* on the ejecting lever 179 is in its non-operating position, indicated by two-dot chain line in FIG. 7 and is disengaged from a bent flange part 182*b* of a cassette housing 182.

Figure 8:
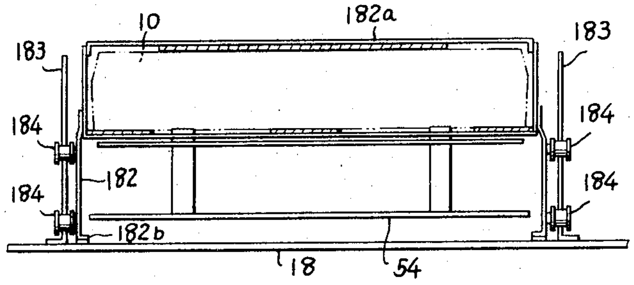
FIG. 8 is an elevation of the cassette housing.

One example of a hop-up mechanism for the cassette housing 182 is illustrated in FIG. 8. The cassette housing 182 is provided at its upper part with a cassette chamber 182a into which a cassette 10 may be inserted. In the vicinity of the housing 182 and on opposite sides thereof, there are provided a pair of vertical guide plate 183 contacted by guide rollers 184 rotatably supported by the housing 182. The cassette housing 182, therefore, can be raised or lowered vertically as the guide rollers 184 are guided by the guide plates 183.

The PLAY button (not shown), of the recording-reproducing apparatus is depressed, after a cassette 10 has been inserted into the cassette chamber 182*a*, and the cassette housing 182 has been pushed down. For playing, the plunger 116 operates by way of the operating bar 115, the lever 118, and a rod 185 to cause the ejecting lever 179 to rotate in the clockwise direction counter to the force of the spring 180. The cassette housing 182 is locked in its pushed down position by the engagement of its bent flange part 182*b* by the engagement part 179*a* of the lever 179.

When the recording-reproducing apparatus starts its loading operation, and the guide post 50 moves along the guide plate 55, the lever 173 is released from the engagement of the detecting part 173*a* by the post 50. Lever 173 is rotated in the counterclockwise direction by the tension of the spring 177 within a range limited by the bar 176 and the pin 175. The engagement relationship between the bar 176 and the pin 175 at this time is as indicated in FIGS. 2 and 6. The locking lever 172 is in a state wherein it can rotate in the clockwise direction. Consequently, the engagement pin 170 of the revolving ring 26 assumes a state wherein it is merely engaged by the locking lever 172. The revolving ring 26 is released from its locked state. As a consequence of the counterclockwise rotation of the lever 173, the ejecting lever 179 is engaged by the bent part of the rod 178 and is thereby retained in its operational position.

After completion of the drawing out of the tape 16 from the cassette 10 by the guide post 50, the revolving ring 26 starts to rotate in the clockwise direction. The engaging pin 170 causes the ring-locking lever 172 to rotate first in the clockwise direction against the force of the spring 177 and then disengages from the engagement part 172*a*. The shape of the cutout part of the engagement part 172*a* is so designed that, when the engagement pin 170 moves clockwise, together with the ring 26, it can be easily disengaged by the ring locking lever 172. Moreover, the lever 172 can be rotated within a range wherein the pin 175 operates independently of the bar 176. A feature of the above described mechanism is that, even in the case where, after completion of the loading operation, the recording-reproducing apparatus is placed in the recording or reproducing mode of operation, the cassette housing 182 is retained in its locked state since its bent flange part 182*b* is caught by the engaging part 179*a* of the ejecting lever 179, and the cassette 10 cannot be ejected and taken out.

When a STOP button (not shown) is depressed to place the recording-reproducing apparatus in the unloding mode of operation, the above described loading means operates in the direction opposite to that at the time of loading. At the same time, the power source circuit of the plunger 116 for playing is opened. As a consequence, the plunger 116 is rendered inoperative. The operating bar 115 and the lever 118 operate in directions opposite to those described above. Since the rod 185 is coupled to the lever 118 by the slidable engagement of one end thereof with a slot 118a formed in the lever 118, the rod 185 is not actuated by the above mentioned movement of the lever 118. The ejecting lever 179 is arrested by the other end of the bar 176 coupled to the lever 173, which is in the position to which it has been rotated in the counterclockwise direction. Consequently, the lever 179 is still in the position to which it has been rotated in the clockwise direction against the force of the spring 180. The cassette housing is retained in its locked state, its bent flange 182*b* being arrested by the engaging part 179*a* of the lever 179.

As the unloading operation progresses, the tape 16 which has been drawn out is completely accommodated within the cassette 10. The guide post 50 engages the detecting part 173*a* of the lever 173, which is in the position to which it has rotated in the clockwise direction. This rotates lever 173 in the clockwise direction against the force of the spring 177. This rotation of the lever 173 is transmitted by way of the rod 178 to cause the ejecting lever 179 to be turned in the counterclockwise direction by the spring 180. As a consequence, the engaging part 179*a* of the ejecting lever 179 disengages from the bent flange part 182*b* of the cassette housing 182, which thereby is moved upward as viewed in FIG. 8. The guide rollers 184 are guided by the guide plates 183, and housing 182 assumes the state wherein the cassette 10 can be taken out. Upon completion of the above described unloading operation, the engaging pin 170 is engaged with the bent engaging part 172*a* of the locking lever 172. Moreover, lever 172 is in a state wherein its clockwise rotation is restricted by the bar 176. Therefore, the revolving ring 26 is fully locked.

When a fast-forward button and a rewind button (not shown) are depressed, the recording-reproducing apparatus is changed over respectively to fast-forward and rewind modes of operation, each of which is carried out without the tape 16 being drawn out of the cassette 10. In such cases, the plunger 116 is rendered operative. The cassette housing 182 is in the locked state, its bent flange part 182*b* being held by the engaging part 179*a* of the ejecting lever 179.

As described above, the cassette housing 182 accommodating the cassette 10 is locked in its operative position when the recording-reproducing apparatus is carrying out the operations of loading, recording or reproducing, unloading, fast-forwarding, and rewinding. For this reason, the cassette 10 cannot be taken out during these operations. Therefore, this locked housing 182 prevents accidental occurrences (such as damage to the tape 16 and the recording-reproducing apparatus) due to an inadvertent extraction of the cassette 10 with the tape 16 in the drawn out state.

Furthermore, the revolving ring 26, which is provided on its upper surface with parts such as the pinch roller 63 and the guide post 66 is held rotatably with an inclined attitude relative to the chassis 18. Ring 26 is subject to unnecessary rotation due to influences such as slight external forces and impact particularly when the recording-reproducing apparatus is in the non-operating state. Ring 26 is locked in a designed non-operating position when the guide post 50 (for drawing the tape 16 out of the cassette 10) is in its non-operating position. Therefore, erroneous loading operation can be prevented. Moreover, the loading operation can be carried out in a positive and reliable manner.

Figures 9A, 9B:
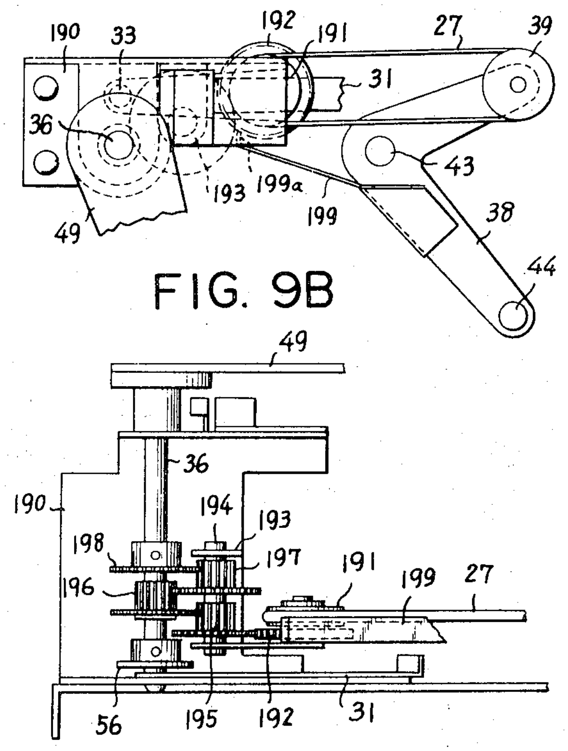
FIGS. 9A and 9B are respectively a partial plan view and a corresponding elevation showing another embodiment of driving mechanism of the tape drawing out means of the apparatus of the invention.

Next, another embodiment of the tape drawing out means and the driving mechanism will be described with reference to FIGS. 9A and 9B. In both figures, parts which are the same as or similar to those of the apparatus illustrated in FIGS. 1 and 3 are designated respectively by the same reference numerals, and repetitive description of these parts is omitted.

The driving power of the belt 27 (to which driving power is being transmitted from the driving wheel 25 driven by the motor 17 for loading) is transmitted to a pulley 191 rotatably supported on a support member 190 fixed to the chassis 18. The resulting rotation of the pulley 191 is transmitted by way of a gear 192 fixed to the same shaft as the pulley 191, a gear 195 rotatably supported on a shaft 194 held by a support member 193 provided on the support member 190, a gear 196 rotatably supported on the shaft 36, and a gear 197 rotatably supported on the shaft 194 and hence, after a substantial reduction in speed, to a gear 198 fixed to the shaft 36 as a counterclockwise rotation.

As described hereinbefore, after the shaft 36 has rotated in the counterclockwise direction through a required angle, and the guide lever 49 and 51 have reached their positions indicated in FIG. 2, the revolving ring 26 starts to revolve in the clockwise direction, and the L-shaped lever 38 is turned in the clockwise direction. During this operation, an engagement part 199*a* at the extremity of a locking lever fixed to the lever 38 is inserted into the space between two adjacent teeth of the gear 192, thereby locking parts such as the guide lever 49 in their positions indicated in FIG. 2. The shape of the aforementioned cutout part 26*a* of the revolving ring 26 is so designed that the locking lever 199 will carry out the above described locking operation prior to the engagement of the tape 16 by the guide post 66.

The guide post 50 not only operates as a member merely for drawing out the tape when the magnetic tape 16 is to be drawn out but also functions after drawing out the tape to guide the tape in the recording or reproducing operation. Accordingly, the position of the guide post is stabilized by the locking of the guide lever 49 as described above, whereby there is no possibility of instability of the travel of the tape 16 guided thereby.

Further, this invention is not limited to these embodiments but various variations and modifications may be made without departing from the scope and spirit of the invention.

What we claim is:

1. An automatic tape loading type recording and/or reproducing apparatus comprising: a guide drum having a cylindrical surface with at least one rotating head; a tape cassette having built in tape reels for holding a tape and having a housing provided with an opening extending from a front surface to a part of a bottom surface thereof; tape drawing out means comprising at least one movable lever means having a tape drawing out and guiding member which is inserted into said cassette to make contact with the inner side of said tape; moving means for moving said tape drawing out means to a predetermined position thereby to cause said tape drawing out and guiding member to draw the tape out of the cassette via said opening in said cassette housing; tape pulling around means for intercepting the tape thus drawn out and for pulling the tape around in a manner to cause the tape to wrap around a predetermined arcuate portion of the cylindrical surface of said guide drum; a single driving power source; first driving power transmitting means operating at the start of tape loading to transmit the driving power of said single driving power source to said moving means; means for detecting the completion of the movement of said tape drawing out means to said predetermined position; second driving power transmitting means operating in response to the operation of said detecting means to start the transmission of the driving power of said single driving power source to said tape pulling around means; and means operating in response to the start of operation of said tape pulling around means to cause said first driving power transmitting means to cease transmitting driving power.

2. The apparatus according to claim 1 in which the tape pulling around means comprises a revolving ring-shaped member encompassing the guide drum and revolvably supported with an inclination relative to the rotating surface of said at least one rotating head and a tape guiding member secured to said revolving ring-shaped member and adapted to intercept the drawn out tape and pull around the same in concert with the revolution of the ring-shaped member, and said second transmission means includes roller means for making contact against the internal circumferential surface of the revolving ring-shaped member and to drive the same in revolving movement.

3. The apparatus according to claim 1 in which said first transmission means includes a driving roller which is driven by the single driving power source and a driving belt pressed against said driving roller thereby to receive rotational power therefrom and operating to transmit said power to the moving means, and said means for causing the first transmission means to cease transmitting driving power includes means operating in response to the start of operation of the tape pulling around means to separate said driving belt from said driving roller.

4. The apparatus according to claim 1 which further comprises braking means for applying braking torque to the rotation of a tape reel for supplying the tape from the interior of said cassette housing, control means for detecting the tension of the tape thus supplied and controlling accordingly said braking torque of the braking means, and an engagement member for making contact against and engaging said control means while the tape drawing out means is operating and separating from and releasing the control means when the tape pulling around means starts to operate, the control means being engaged by said engaging member during operation of the tape drawing out means thereby to cause said braking means to remove said braking torque and being released by and separated from the engagement member during operation of the second tape guiding means thereby to cause the braking means to carry out braking operation.

5. The apparatus according to claim 1 which further comprises means for locking the tape drawing out means when it has moved to said predetermined position, and said tape drawing out and guiding member operates as a tape guiding member also with respect to the path of travel of the tape after automatic tape loading by the operation of the tape pulling around means.

* * * * *